United States Patent
Kuhlmann et al.

(10) Patent No.: US 8,829,367 B2
(45) Date of Patent: Sep. 9, 2014

(54) FORCE PLATE WITH SPRING ELEMENTS

(75) Inventors: Otto Kuhlmann, Goettingen (DE); Tanja Mueck, Langelsheim (DE); Volker Relling, Gross Niendorf (DE); Gerald Petzold, Luetjensee (DE)

(73) Assignee: Sartorius Lab Instruments GmbH & Co. KG, Goettingen (DE)

( * ) Notice: Subject to any disclaimer, the term of this patent is extended or adjusted under 35 U.S.C. 154(b) by 68 days.

(21) Appl. No.: 13/104,566

(22) Filed: May 10, 2011

(65) Prior Publication Data
US 2011/0209926 A1   Sep. 1, 2011

Related U.S. Application Data

(63) Continuation of application No. PCT/EP2009/007736, filed on Oct. 29, 2009.

(30) Foreign Application Priority Data

Nov. 11, 2008 (DE) .......................... 10 2008 056 715

(51) Int. Cl.
  *G01G 3/14* (2006.01)
  *G01L 1/22* (2006.01)
  *G01L 1/04* (2006.01)
  *G01G 23/00* (2006.01)

(52) U.S. Cl.
  CPC .............. *G01G 23/002* (2013.01); *G01L 1/044* (2013.01); *G01G 3/1414* (2013.01)
  USPC .................. 177/211; 73/862.627; 73/862.629

(58) Field of Classification Search
  CPC ... G01G 3/1402; G01G 3/1404; G01G 3/141; G01L 1/22; G01L 1/2212; G01L 1/2206; G01L 1/2231; G01L 1/2237
  USPC ...................... 177/211; 73/862.627–862.634, 73/862.636–862.639
  See application file for complete search history.

(56) References Cited

U.S. PATENT DOCUMENTS

| | | | |
|---|---|---|---|
| 3,951,221 A | 4/1976 | Rock | |
| 4,125,168 A | 11/1978 | Ormond | |
| 4,381,826 A * | 5/1983 | Kupper | .......................... 177/211 |
| 4,483,203 A | 11/1984 | Capper | |
| 4,548,086 A * | 10/1985 | Kastel | ...................... 73/862.632 |

(Continued)

FOREIGN PATENT DOCUMENTS

| | | |
|---|---|---|
| DE | 2543354 A1 | 4/1976 |
| DE | 2813769 A1 | 2/1979 |

(Continued)

*Primary Examiner* — Randy W Gibson
(74) *Attorney, Agent, or Firm* — Edell, Shapiro & Finnan, LLC

(57) ABSTRACT

Force plate (1) having a plate-shaped carrier (2) which, when arranged vertically, has an upper carrier section (3) at the top in the vertical direction and a lower carrier section (4) at the bottom in the vertical direction. A first end carrier section (5) is connected, on the one hand, to the upper carrier section (3) via a vertical rod (7) and, on the other hand, to the lower carrier section (4) via a horizontally oriented spring element (6). That end of the lower carrier section (4) which faces away from the first end carrier section (5) is connected to the upper carrier section (3) via a horizontal rod (8). A second end carrier section (15) connects the horizontal rod (8) to the lower carrier section (4) via a vertically arranged spring element (16).

19 Claims, 4 Drawing Sheets

(56) References Cited

U.S. PATENT DOCUMENTS

| | | | |
|---|---|---|---|
| 4,600,066 A * | 7/1986 | Griffen et al. | 177/211 |
| 4,641,539 A * | 2/1987 | Vilimek | 73/862.636 |
| 4,898,255 A * | 2/1990 | Gaines | 177/211 |
| 4,979,580 A * | 12/1990 | Lockery | 177/211 |
| 5,490,427 A | 2/1996 | Yee et al. | |
| 5,510,581 A * | 4/1996 | Angel | 177/211 |
| 5,786,549 A * | 7/1998 | Serizawa | 177/211 |
| 5,814,740 A * | 9/1998 | Cook et al. | 73/862.641 |
| 5,929,391 A * | 7/1999 | Petrucelli et al. | 177/211 |
| 7,078,631 B2 * | 7/2006 | Wang et al. | 177/211 |
| 7,732,721 B2 | 6/2010 | Mueck et al. | |
| 2009/0114455 A1 | 5/2009 | Mueller et al. | |

FOREIGN PATENT DOCUMENTS

| | | | |
|---|---|---|---|
| DE | 102005060106 A1 | 6/2007 | |
| DE | 102006031950 B3 | 11/2007 | |
| DE | 102008056714 * | 5/2010 | G01G 3/14 |
| DE | 102008056715 * | 5/2010 | G01G 23/00 |
| JP | 09318469 | 12/1997 | |
| WO | 2006096736 A1 | 9/2006 | |

\* cited by examiner

US 8,829,367 B2

FORCE PLATE WITH SPRING ELEMENTS

This is a Continuation of International Application PCT/EP2009/007736, with an international filing date of Oct. 29, 2009, which was published under PCT Article 21(2) in German, and claims priority to German Patent Application No. 10 2008 056 715.9, with a filing date of Nov. 11, 2008, the entire disclosures of which are incorporated into this application by reference.

FIELD AND BACKGROUND OF THE INVENTION

The present invention relates to a force plate comprising a plate-shaped carrier which, when arranged vertically, has an upper carrier section at the top in the vertical direction and a lower carrier section at the bottom in the vertical direction, wherein at least one first end carrier section is provided and is connected, at one side, to the upper carrier section via a vertical rod and, at another side, to the lower carrier section via a horizontally arranged spring element that is provided with strain gauges.

DE 28 13 769 A1, which corresponds to U.S. Pat. No. 4,125,168, discloses a force plate which, together with a second force plate, forms an electronic balance. The known force plate comprises a plate-shaped carrier which is arranged vertically and has an upper carrier section at the top and a lower carrier section at the bottom, wherein, at least at one end side of the force plate, a first end carrier section is provided and is connected, at one side, to the upper carrier section by a vertical rod and, at another side, to the lower carrier section via a horizontally arranged spring element that is provided with strain gauges.

A disadvantage of the known force plate is that further horizontal bending webs or bending rods are provided above and below, arranged parallel to the horizontally arranged spring element that is provided with strain gauges. These bending webs/rods also connect the end carrier section to a further carrier section and are intended to eliminate the effect of disruptive shear forces on the spring element. This results in a force plate which is relatively complex and therefore difficult to produce.

DE 25 43 354 A1, which corresponds to U.S. Pat. No. 3,951,221, discloses a force plate, the upper carrier section of which is connected via a vertical rod to a horizontal spring element that is provided with a strain gauge.

OBJECTS AND SUMMARY OF THE INVENTION

It is therefore an object of the present invention to improve the known force plate so as to make the design and thus the production less complex and more economical. A further object is to reduce or avoid cross-talk between the vertically and horizontally conducted forces.

These objects are addressed by the present invention as claimed and described. According to one formulation, a lower carrier section is connected at an end thereof facing away from a first end carrier section by a horizontal rod to an upper carrier section and a second end carrier section is provided, by which the horizontal rod is connected to the lower carrier section via a vertically arranged spring element that is provided with strain gauges.

The connection of the lower carrier section at one end, via a vertical rod and, at the other end, via a horizontal rod hinders cross-talk of vertical and horizontal force components within the force plate. The force components are decoupled relative to the lower section when a force is conducted into the upper section. The design of the force plate is thereby significantly simplified. The rods of the force plate can also be produced relatively easily and economically by means of slits.

The vertically arranged spring element with strain gauges enables the decoupled horizontal force components to be determined and, for example, to be used for error correction if the balance has been positioned inclined or tilted.

According to a preferred embodiment of the invention, the exterior surface of the spring element facing away from the upper carrier section has the strain gauges arranged in the longitudinal direction of the exterior surface in a row.

The arrangement of the strain gauges on the exterior surface of the spring element simplifies the positioning and production thereof.

According to a further preferred embodiment of the invention, the horizontal spring element as a connection between the lower carrier section and the first end carrier section and/or the vertical spring element as a connection between the lower carrier section and the second end carrier section or the horizontal rod forms a narrowed site, which increases in thickness toward the adjacent carrier sections. The spring element is preferably configured planar on the exterior surface thereof and transitions into the adjacent narrow sides of the support sections.

It is thus possible to arrange four strain gauges in a row at sites of similar extension.

According to a further preferred embodiment of the invention, an overload stop is provided for the horizontally arranged spring element and/or the vertically arranged spring element.

Excessively large forces are thereby transmitted directly from the upper partial section to the lower partial section without loading the spring elements beyond their maximum load capacity.

According to a preferred embodiment of the invention, a region of the plate-shaped carrier surrounding the spring element forms a separate spring element portion which is firmly attached to the remaining portion of the plate-shaped carrier.

It is thus possible to produce the separate, relatively small spring element portion independently of the remaining portion. The spring element portion can thus be produced from a high quality spring material that is relatively expensive and/or more difficult to machine, and the remaining portion can be produced from a spring material that is more economical and/or easier to machine. Preferably the overload stop is arranged in the spring element portion.

According to a further preferred embodiment of the invention, the spring element portion is made from a hardened nickel-chromium-iron alloy which has a nickel content in the range of 36% to 60% and a chromium content in the range of 15% to 25%. Preferably, Inconel is used, as known, for example, from DE 10 2005 060 106 A1.

According to a further preferred embodiment of the invention, the spring element portion with the spring element which is horizontally arranged and the spring element portion with the spring element which is vertically arranged have identical configurations and are connected to the remaining portions at their respective intended positions, for example, by welding or gluing.

The spring element portion can be produced, for example, by wire erosion or laser cutting.

According to a further preferred embodiment of the invention, the strain gauges are applied onto the spring element by thin film deposition, for example, sputtering (cathode vaporization) onto the spring element. In particular, through use of a separately produced spring element, it becomes economically feasible to make available the vacuum necessary for sputtering. Sputtered strain gauges have the advantage that very high resistance strain gauges can be made in this way. This reduces the current usage, which is advantageous in a battery-powered balance.

According to a preferred embodiment of the invention, the force plate is fastened to at least one further force plate to form an electronic balance, in which the upper carrier sections thereof form part of a balance platform chassis and the lower carrier sections thereof form part of a base body of the balance. In particular, in a balance platform chassis with a triangular outline and a corresponding base body, three force plates are used for force transmission.

BRIEF DESCRIPTION OF THE DRAWINGS

Further features of the invention are disclosed in the following detailed description and in the drawings, which illustrate preferred embodiments of the invention in exemplary manner.

In the drawings.

DETAILED DESCRIPTION OF EXEMPLARY EMBODIMENTS

Figure 1:
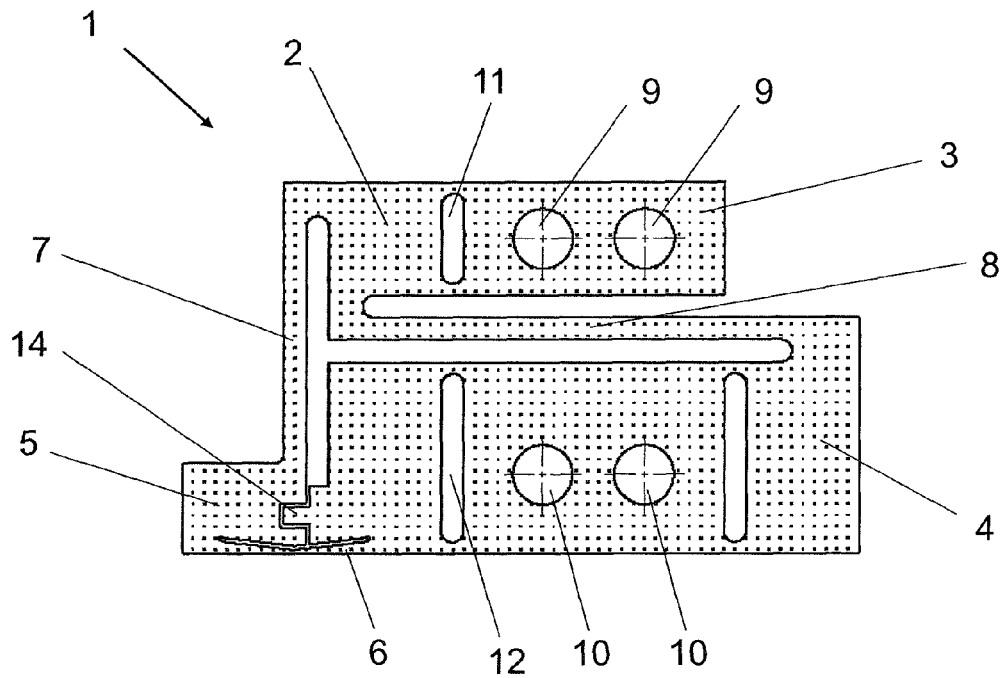
FIG. 1 is a front view of a force plate.

A force plate 1 includes a plate-shaped carrier 2 with an upper carrier section 3, a lower carrier section 4, a first end carrier section 5 and a horizontal spring element 6.

The plate-shaped carrier 2 comprises, at the top in the vertical direction, the upper carrier section 3 which is connected by a vertical rod 7 to the first end carrier section 5 which is positioned in front of the lower carrier section 4. The first end carrier section 5 is, in turn, connected via the horizontally arranged spring element 6 to the lower carrier section 4 which is arranged parallel to the upper carrier section 3. At the end facing away from the first end carrier section 5, the lower carrier section 4 is connected by a horizontal rod 8 to the end of the upper carrier section 3 facing toward the vertical rod 7.

The plate-shaped carrier 2 is configured to be fastened with its upper carrier section 3 via two holes 9 and with its lower carrier section 4 via two holes 10. The vertical slits 11, 12 serve to keep the tensions introduced into the force plate 1 or into the plate-shaped carrier 2 via fastening screws 13 (see, e.g., FIG. 7) away from the remainder of the plate-shaped carrier 2.

An overload stop 16 is arranged between the end carrier section 5 and the lower carrier section 4.

Figure 2:
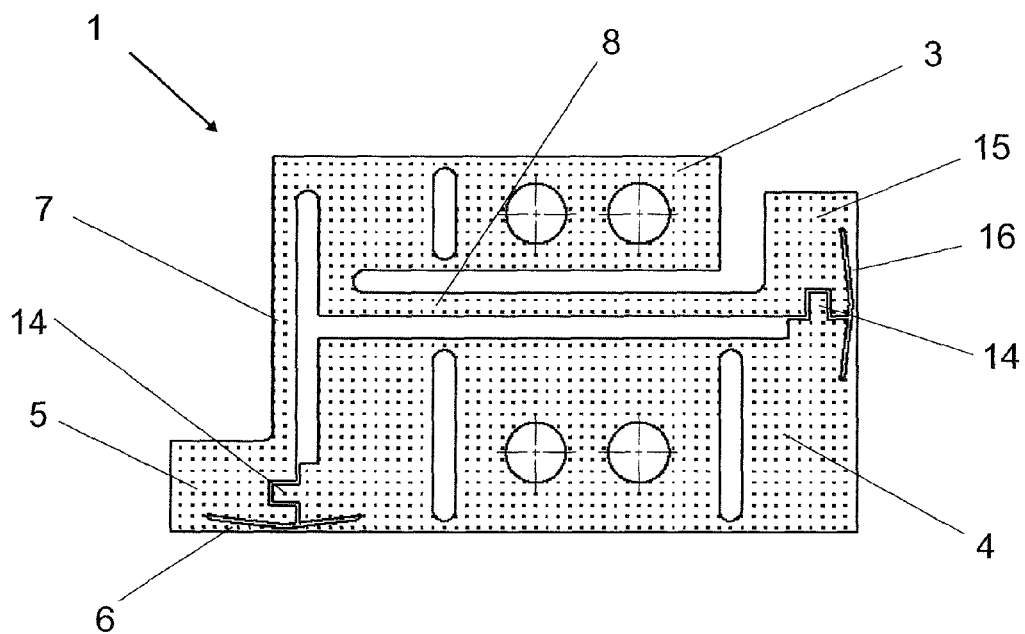
FIG. 2 is a front view of a further force plate with an additional, vertically arranged spring element.
Figure 4:
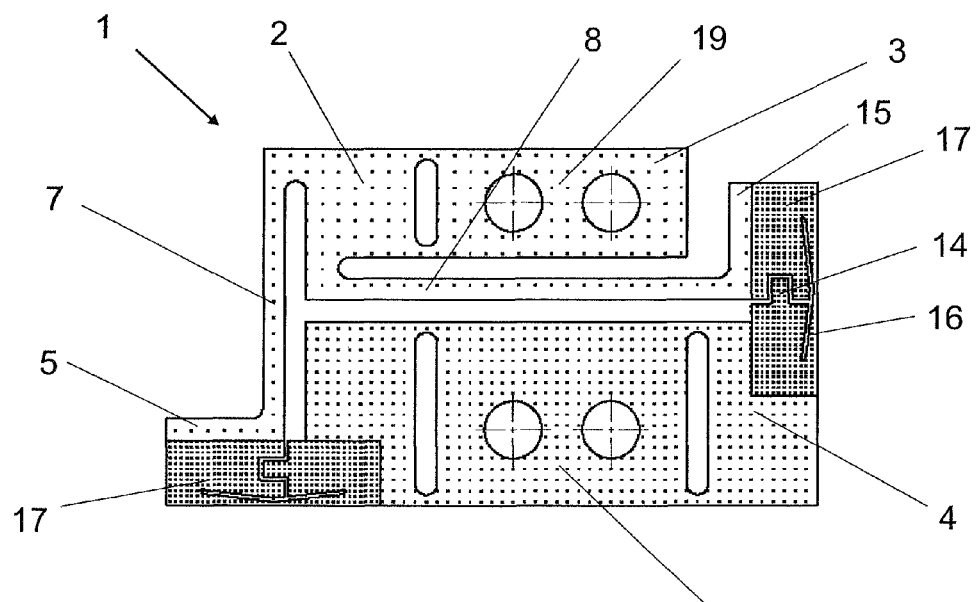
FIG. 4 is a front view of a force plate according to FIG. 2 with two separate spring element portions.

According to the exemplary embodiments in FIGS. 2 and 4, positioned in front of the lower carrier section 4 at the end facing away from the end carrier section 5, is a second end carrier section 15 by which the horizontal rod 8 is connected via a vertically arranged spring element 16 to the lower carrier section 4.

Figure 3:
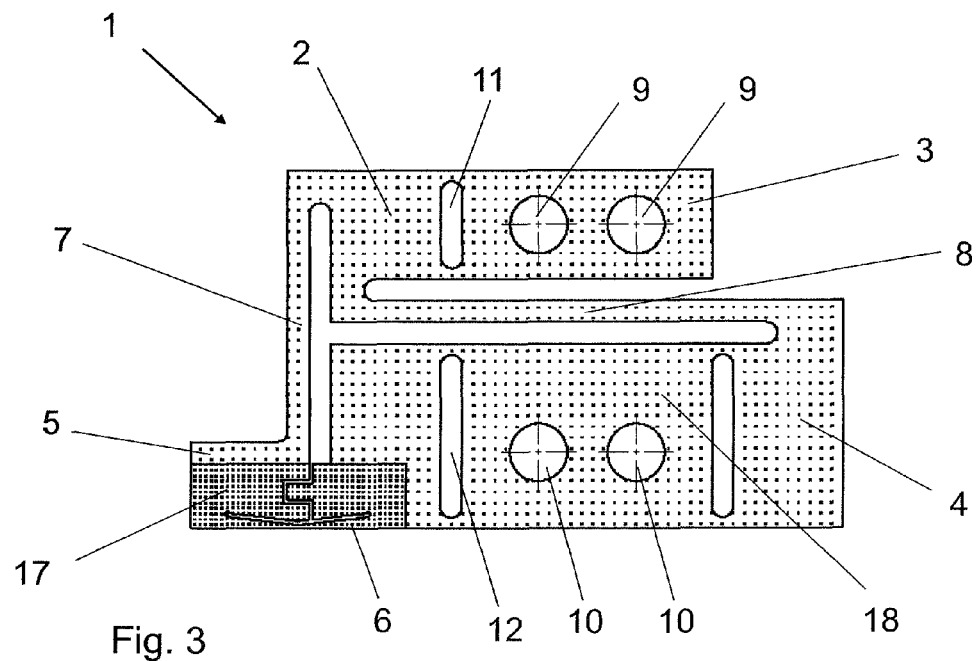
FIG. 3 is a front view of a force plate according to FIG. 1 with a separate spring element portion.

According to the exemplary embodiment of FIG. 3, a region of the plate-shaped carrier 2 surrounding the horizontal spring element 6 forms a separate spring element portion 17, which is firmly attached, for example, by welding or gluing, to a remaining portion 18 of the plate-shaped carrier 2.

According to the exemplary embodiment of FIG. 4, similarly to the exemplary embodiment of FIG. 2, a vertical spring element 16 is provided which is also configured as a separate spring element 17. According to the exemplary embodiment of FIG. 4, the plate-shaped carrier 2 is therefore divided into two separate spring element portions 17 and two remaining portions 19, 20. The four individual portions 17, 19, are produced as separate items and/or in separate processes. The two remaining portions 19, 20 are connected to one another via the two spring element portions 17.

Figure 5:
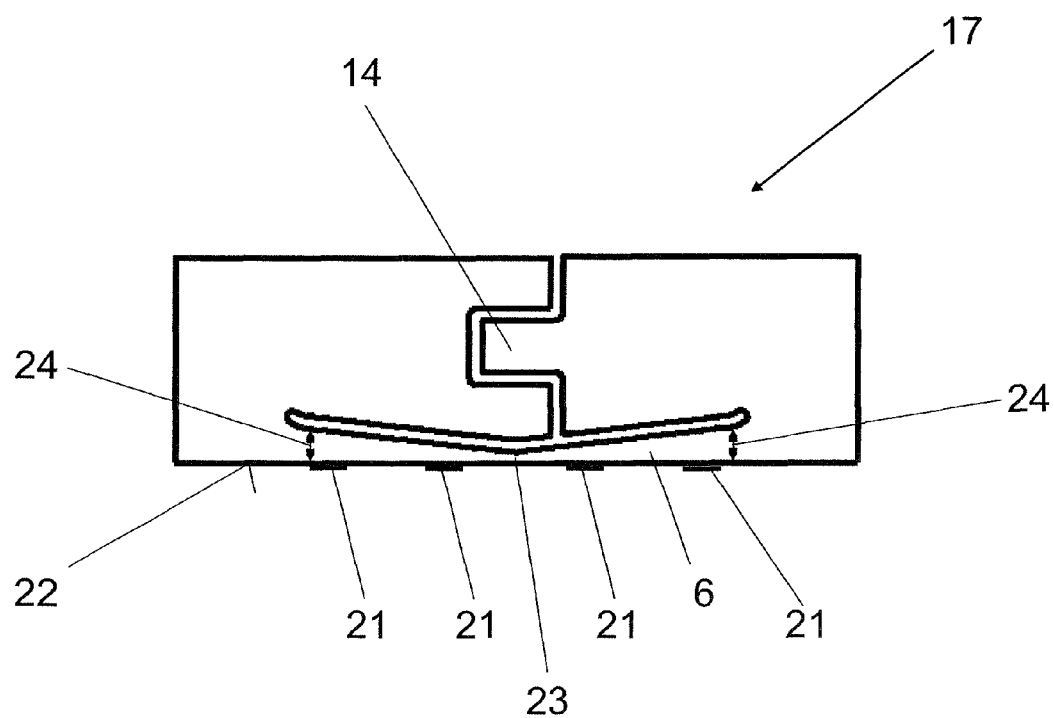
FIG. 5 is a front view of a separate spring element portion in an enlarged representation.

FIG. 5 shows an enlarged representation of a separate spring element portion 17 with a horizontal spring element 6 and four strain gauges 21, which in this embodiment are arranged on the exterior surface 22 in a row in the longitudinal direction. The separate spring element portion 17 includes the overload stop 14. The same applies accordingly to a further, vertically arranged, spring element portion 17.

The spring element 6 provides a centrally arranged thin site 23 and increases in thickness 24 with proximity to the adjacent carrier sections 4, 5. The exterior surface 22, which carries the strain gauges 21, however, is formed to be planar.

Figure 6:
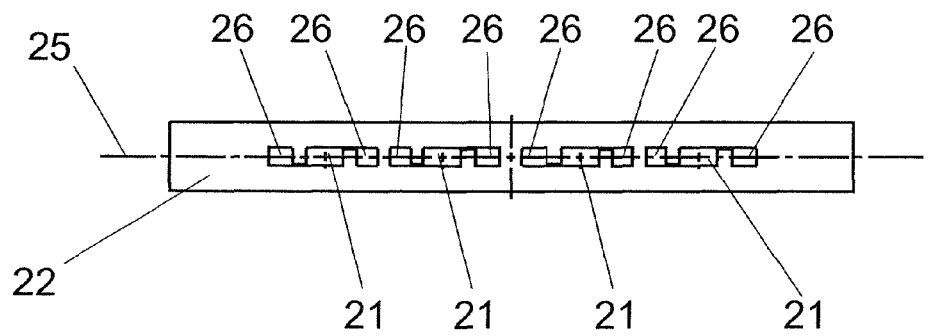
FIG. 6 is a plan view of a separate spring element portion with four strain gauges arranged in a row in the longitudinal direction.

FIG. 6 shows an exterior surface 22 with four strain gauges 21 mounted thereon with connections 26. The strain gauges 21 and connections 26 are applied by sputtering under vacuum onto the exterior surface 22 of the separate spring element portion 17. To illustrate the longitudinal direction of the exterior surface 22, a longitudinal axis 25 is shown in FIG. 6.

Figure 7:
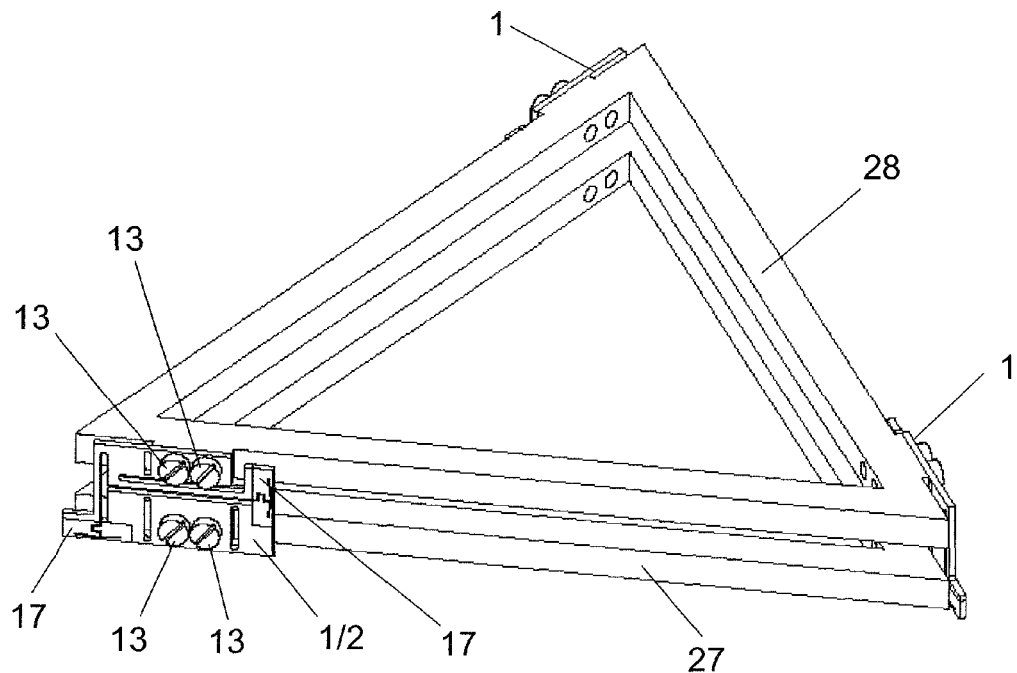
FIG. 7 is a perspective view of a balance platform chassis connected via three force plates to a base body.
Figure 8:
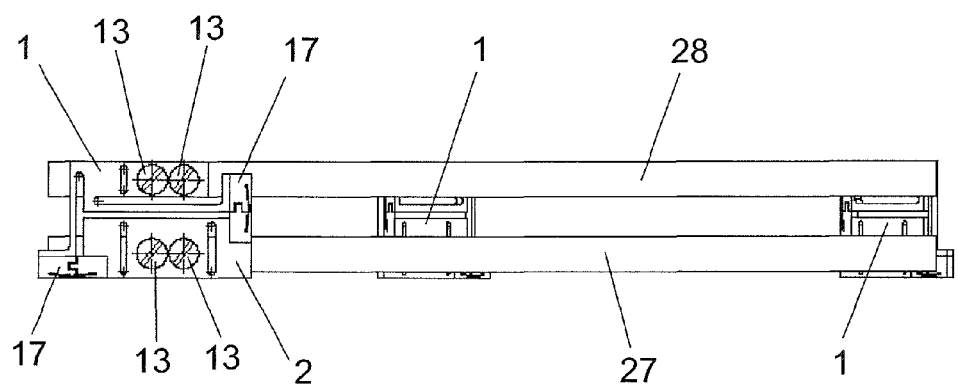
FIG. 8 is a front view of the balance of FIG. 7.

FIGS. 7 and 8 show an embodiment of a balance (while omitting conventional details that would be known to one skilled in the art) wherein a base body 27 with an equilateral triangular outline is connected via three force plates 1 to a correspondingly formed balance platform chassis 28.

The above description of the preferred embodiments has been given by way of example. From the disclosure given, those skilled in the art will not only understand the present invention and its attendant advantages, but will also find apparent various changes and modifications to the structures disclosed. The applicant seeks, therefore, to cover all such changes and modifications as fall within the spirit and scope of the invention, as defined by the appended claims, and equivalents thereof.

What is claimed is:

1. A force plate comprising a plate-shaped carrier which, when arranged vertically, comprises:

an upper carrier section at the top in the vertical direction and configured to be fastened to a balance platform chassis arranged horizontally, a lower carrier section at the bottom in the vertical direction and configured to be fastened to a base body arranged horizontally, a first end carrier section connected at one side thereof to the upper carrier section by a vertical rod and at another side thereof to the lower carrier section via a horizontally arranged spring element that has strain gauges, wherein the lower carrier section is connected at an end thereof facing away from the first end carrier section via a horizontal rod to the upper carrier section, and a second end carrier section, by which the horizontal rod is connected to the lower carrier section via a vertically arranged spring element that has strain gauges, wherein the horizontally arranged spring element is configured with a first planar exterior surface extending along a peripheral portion of the plate-shaped carrier and opposing the vertical rod, and extends into the first end carrier section, wherein the vertically arranged spring element is configured with a second planar exterior surface extending along a peripheral portion of the plate-shaped carrier and opposing the horizontal rod, and extends into the second end carrier section, and wherein the strain gauges are provided on the respective exterior surfaces of each of the spring elements.

2. The force plate as claimed in claim 1, wherein at least one of:
the horizontal spring element as a connection between the lower carrier section and the first end carrier section and
the vertical spring element as a connection between the lower carrier section and the second end carrier section
forms a narrowed site, which increases in thickness toward adjacent ones of the carrier sections.

3. The force plate as claimed in claim 1, wherein
the strain gauges are arranged in respective rows in longitudinal directions of the first and second planar exterior surfaces.

4. The force plate as claimed in claim 1, wherein
at least one of the horizontally arranged spring element and the vertically arranged spring element comprises an overload stop.

5. The force plate as claimed in claim 1, wherein
the plate-shaped carrier comprises at least one region surrounding at least one of the spring elements, forming at least one spring element portion which is integrally formed as a unitary piece that is separately formed and firmly attached to a remaining portion of the plate-shaped carrier.

6. The force plate as claimed in claim 5, wherein
an overload stop is arranged in the spring element portion.

7. The force plate as claimed in claim 5, wherein
the spring element portion and the remaining portion of the plate-shaped carrier are made from differing materials.

8. The force plate as claimed in claim 7, wherein
the spring element portion consists essentially of a hardened nickel-chromium-iron alloy.

9. The force plate as claimed in claim 5, wherein
the spring element portion with the horizontally arranged spring element and the spring element portion with the vertically arranged spring element are identically configured.

10. The force plate as claimed in claim 5, wherein
the spring element portion is produced by wire erosion.

11. The force plate as claimed in claim 1, wherein
the strain gauges are applied onto the spring element by thin film deposition.

12. The force plate as claimed in claim 1, wherein the vertical rod and the horizontal rod are integrally formed with the upper carrier section.

13. The force plate as claimed in claim 1, wherein the plate-shaped carrier has mutually orthogonal width, thickness and height dimensions, and wherein the width and the height dimensions each exceed the thickness dimension by at least tenfold.

14. The force plate as claimed in claim 5, wherein the spring element portion has mutually orthogonal width, thickness and height dimensions, and wherein the width and the height dimensions each exceed the thickness dimension by at least tenfold.

15. An electronic balance comprising:
a balance platform chassis extending in the horizontal direction,
a base body extending in the horizontal direction, and
at least three force plates each as claimed in claim 1 and each fastened with the upper carrier section thereof to the balance platform chassis and with the lower carrier section thereof to the base body of the balance.

16. An electronic balance comprising:
a balance platform chassis and a base body, wherein
the balance platform chassis and the base body each defines a respective triangular circumference, and
three force plates each as claimed in claim 1 and each respectively interconnecting the balance platform chassis and the base body, and configured to transmit forces exerted on the balance platform.

17. A force plate comprising:
a first carrier section,
a second carrier section,
a first end carrier section,
a first rod section interconnecting the first carrier section and the first end carrier section,
a second end carrier section, and
a second rod section interconnecting the first carrier section and the second end carrier section,
wherein the first end carrier section and the second carrier section are configured to form a first spring element,
wherein the first spring element is provided with at least one strain gauge,
wherein the second end carrier section and the second carrier section are configured to form a second spring element oriented at least substantially orthogonally to the first spring element,
wherein the second spring element is provided with at least one further strain gauge,
wherein at least three of the sections are integrally formed as a single piece,
wherein the force plate has mutually orthogonal width, thickness and height dimensions,
wherein the width and the height dimensions are each at least tenfold the thickness dimension in length, and
wherein the strain gauges are provided exclusively across the thickness dimension of the force plate.

18. The force place as claimed in claim 17, wherein the first carrier section, the first rod section and the second rod section are integrally formed as the single piece.

19. The force plate as claimed in claim 18, wherein:
the first spring element, formed from the first end carrier section and the second carrier section, is integrally formed as a second single piece, and
the second spring element, formed from the second end carrier section and the second carrier section, is integrally formed as a third single piece.

* * * * *